United States Patent [19]
Fuchs

[11] Patent Number: 5,895,594
[45] Date of Patent: Apr. 20, 1999

[54] METHOD AND DEVICE FOR HEATING CARRIER BODIES

[75] Inventor: Paul Fuchs, Schalchen, Austria

[73] Assignee: Wacker Chemie GmbH, München, Germany

[21] Appl. No.: 08/802,990

[22] Filed: Feb. 21, 1997

[30] Foreign Application Priority Data

Mar. 7, 1996 [DE] Germany ............. 196 08 885

[51] Int. Cl.⁶ ............. C30B 25/08; C30B 25/10; H05B 3/66; F27B 1/09
[52] U.S. Cl. ............. 219/411; 118/50.1; 118/724; 118/719; 219/409; 392/411; 392/412; 392/418; 427/557; 438/466; 438/799
[58] Field of Search ............. 219/390, 405, 219/411; 392/411, 412, 415, 416, 418; 427/557, 585, 587, 588, 592, 593; 438/466, 799; 118/719, 724, 725, 733, 50.1; 117/88, 935; 423/349, 350

[56] References Cited

U.S. PATENT DOCUMENTS

| 3,240,915 | 3/1966 | Carter et al. | 392/411 |
|---|---|---|---|
| 3,761,678 | 9/1973 | Eckles | 392/411 |
| 4,147,814 | 4/1979 | Yatsurugi et al. | 423/349 |
| 4,173,944 | 11/1979 | Koppl et al. | 118/719 |
| 4,179,530 | 12/1979 | Koppl et al. | 423/349 |
| 4,311,545 | 1/1982 | Bugl et al. | 117/102 |
| 4,503,807 | 3/1985 | Nakayama et al. | 118/719 |
| 4,805,556 | 2/1989 | Hagan et al. | 118/725 |
| 5,169,478 | 12/1992 | Miyamoto et al. | 118/725 |
| 5,382,419 | 1/1995 | Nagai et al. | 423/349 |
| 5,478,396 | 12/1995 | Keck et al. | 118/719 |
| 5,482,557 | 1/1996 | Kanai et al. | 118/719 |

FOREIGN PATENT DOCUMENTS

| 2854707 | 7/1980 | Germany . |
|---|---|---|
| 7-45518 | 2/1995 | Japan . |

Primary Examiner—Teresa Walberg
Assistant Examiner—J. Pelham
Attorney, Agent, or Firm—Collard & Roe, P.C.

[57] ABSTRACT

A method and device for heating silicon carrier bodies in a deposition reactor are by means of radiated heat. In this method, the carrier bodies are irradiated by means of a heat radiation device which emits radiation having a color temperature of at least 2000° C.

14 Claims, 2 Drawing Sheets

METHOD AND DEVICE FOR HEATING CARRIER BODIES

BACKGROUND OF THE INVENTION

1. Field of the Invention

The present invention relates to a method for heating silicon carrier bodies in a deposition reactor by means of radiated heat. The invention also relates to a device for carrying out the method.

2. The Prior Art

Polycrystalline silicon rods, so-called polyrods, are produced by thermal decomposition of gaseous silicon compounds in a deposition reactor, elemental silicon being formed. In the deposition reactor there are heated carrier bodies, so-called slim rods, on which the silicon deposits They are normally also composed of silicon and grow in the course of the deposition to the desired polyrods. The slim rods are brought to the required deposition temperature by direct current passage. They have to be heated beforehand by means of a heat radiation system until the so-called firing temperature is reached at which the ohmic resistance with which they oppose the current flow when a voltage is applied has become sufficiently low. It is only then that further heating to the deposition temperature takes place by direct current passage. The polyrods produced are an important basic material for the production of high-purity silicon, for example for the production of silicon monocrystals. They must therefore meet very strict purity requirements.

In accordance with German Patent No. DE-28 54 707 C2, to fire the slim rods, a heating finger is lowered down from the reactor top to just above the deposition-reactor base with the reactor open. After the firing temperature is reached, the heating finger is retracted from the deposition reactor again and the opening of the deposition reactor is closed by means of a lid. It is particularly unfavourable that the deposition reactor has to be opened comparatively wide, under which circumstances oxygen can easily get in. In particular, there is the danger that particles from the surrounding room air or particles which originate from the heating finger itself get into the deposition reactor and are later incorporated in the polyrods as impurities. Before the deposition of silicon on the carrier bodies can be started, the deposition reactor has to be carefully flushed with inert gas in order to remove entrained oxygen again. Particles which had been entrained previously can, however, only be removed thereby to an inadequate extent.

Heating fingers which comprise a bundle of metal-clad electrical heating coils are used. They are surrounded by a cylindrical quartz sheath which is flushed with inert gas. Current is passed through the heating coils, so that they are heated to about 900° C. and are able to bring the slim rods to firing temperature. Because of the high temperature loading and the presence of traces of oxygen, the heating coils, the metal cladding and the electrical contacts of the heating finger are, in particular, subject to continuous oxidative corrosion. This circumstance makes short maintenance cycles necessary, and during these the heating finger cannot be used. In addition, as a result of the continuing corrosion, particles are continuously formed which may contaminate the polyrods.

Further disadvantages result from the size of the heating finger. Since the heating finger has to extend down to near the base of the deposition reactor so that the slim rods can be heated to the firing temperature, the deposition reactor has to be accommodated in unusually high operating rooms. Only then is there enough room available for the heating finger above the open deposition reactor. In addition, the heating finger is relatively heavy as a result of its weight of about 200 kg and requires a lifting and lowering device which can move such loads reliably

SUMMARY OF THE INVENTION

It is an object of the present invention to simplify the heating of the slim rods to firing temperature and to avoid the disadvantages described in relation to the use of known heating fingers.

The above object is achieved by the present invention which relates to a method for heating silicon carrier bodies in a deposition reactor by means of radiated heat, which method comprises irradiating the carrier bodies by means of a heat radiation system which emits radiation having a color temperature of at least 2000° C. The invention also relates to a device for carrying out the method.

The transition to higher color temperatures makes it possible to use compact heat radiation systems which have a low weight, have a low maintenance requirement and are very easy to handle. The introduction of ambient air or particles into the deposition reactor can be substantially limited. This is all the more surprising since experiments carried out by the inventors showed that the firing temperature cannot be achieved by means of heating fingers of known design whose length has been shortened because those parts of the slim rods furthest removed from the heating finger are no longer adequately heated.

The heat radiation system in accordance with the invention comprises at least one heating element, preferably a bundle of 6 to 12 heating elements. It is particularly preferable that the heating elements are annularly disposed. To protect the heating elements against overheating, a cooling system is proposed. Particularly effective cooling is achieved by means of a cooling body made of a material, such as silver or gold-coated silver, with good thermal conductivity Particularly preferred is an actively cooled reflector made of silver and having a polished surface around which the heating elements are disposed. Including the cooling body within the structure makes it possible to prevent the heating elements from being mutually overloaded with radiation energy. In addition, the reflecting surface ensures that the heat radiation produced is radiated almost completely and distributed uniformly in the deposition reactor. The inside wall of the deposition reactor is preferably also composed of a material, such as, for example, silver, which reflects heat radiation well, so that the heat radiation reflected from the inside wall is also used to heat the carrier bodies.

The preferred radiation sources which can be used as heating elements because they produce the necessary color temperature include incandescent lamps, in particular halogen/quartz radiators and radiant heaters. They essentially comprise one or more incandescent wires which are hermetically sealed from the environment by a quartz glass sheath. They are notable for a long service life, a low maintenance requirement and, not least, for low prices. Of particular advantage are their low weight and their comparatively small dimensions. In addition, infrared quartz radiators and gas discharge lamps are particularly suitable as radiation sources.

To heat carrier bodies in deposition reactors of normal size, it is usually sufficient if the heat radiation system is designed for an electrical power of 5 to 60 kW, preferably 15 to 30 kW. The heat radiation system is brought, preferably from the top of the open deposition reactor, to a working position, which may be situated comparatively far above the base of the deposition reactor. It is preferable that the minimum distance between the base of the deposition reactor and the heat radiation system disposed in the working position is at least 1500 mm. The heat radiation system is preferably of cylindrical construction, the diameter not being greater than 200 mm and is preferably 100 mm or less. Compared with known heating fingers, the heat radiation system has a diameter which is up to 50% less and a weight which is up to 70% less. Because of the small diameter, the deposition reactor does not have to be opened wide to introduce the heat radiation system.

In principle, the heat radiation system can be brought into the working position in a manner already known, for example, by removing a covering plate from the top of the deposition reactor and lowering the heat radiation system into the deposition reactor with the aid of a lifting and lowering device via the opening generated by the covering plate. It is, however, preferable to use a closable protective tube which is linked to the deposition reactor and through which the heat radiation system is introduced into the deposition reactor.

For this purpose, the heat radiation system is attached to the top of a holder and the holder is moved by a motorized drive through the open protective tube in the direction of the interior of the deposition reactor. The protective tube protects the heat radiation system against mechanical damage and is used as guide housing when the heat radiation system is introduced into the deposition reactor.

A further embodiment of the invention provides an isolating member with which the deposition reactor can be opened and gastightly closed. The isolating member also makes it possible to close the deposition reactor even when the heat radiation system is still in the protective tube. Suitable isolating members are, for example, devices with a gate valve or ball stop-cock. The interior of the deposition reactor is secured against the penetration of ambient air by seals between the protective tube and the holder of the heat radiation system, which holder acts as a guide, even when the heat radiation system is in operation and the deposition reactor is opened. To be on the safe side, channels flushed with inert gas may be provided in the protective tube, and these form an additional barrier to the ambient air.

If the heat radiation system is in the working position, the carrier bodies are irradiated with thermal radiation having a color temperature of at least 2000° C., preferably 2000° C. to 3500° C. The irradiation is terminated when a particular electrical voltage applied to the carrier bodies causes a specified current flow. This situation is usually reached when the carrier bodies are at a temperature of approximately 1100° C.

In accordance with an embodiment of the method, the heat radiation system is raised out of the deposition reactor after the firing temperature has been reached and the reactor is closed. The heat radiation system may, in this case, be left in a rest position in the protective tube or be transferred to the protective tube of another deposition reactor. In accordance with another embodiment of the method, the heat radiation system remains in the working position even during the deposition of silicon without being in operation.

When the polyrods have grown to a planned size, the deposition of silicon is terminated. The polyrods then begin to cool, but at different rates on the outside and inside. Due to the radial temperature gradient produced, stresses occur in the semiconductor material and there is the risk that the stresses cause cracks or material breaks and the polyrods consequently become unusable for particular applications. A further embodiment of the method therefore provides for the cooling of the polyrods to be accompanied by the supply of radiated heat so that the formation of an unduly severe radial temperature gradient is prevented. If the heat radiation system is left in the deposition reactor during the deposition of silicon, the irradiation of the cooling polyrods can be started immediately. Otherwise, the heat radiation system is returned to its working position in the deposition reactor after the deposition.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the several views.

Figure 1:
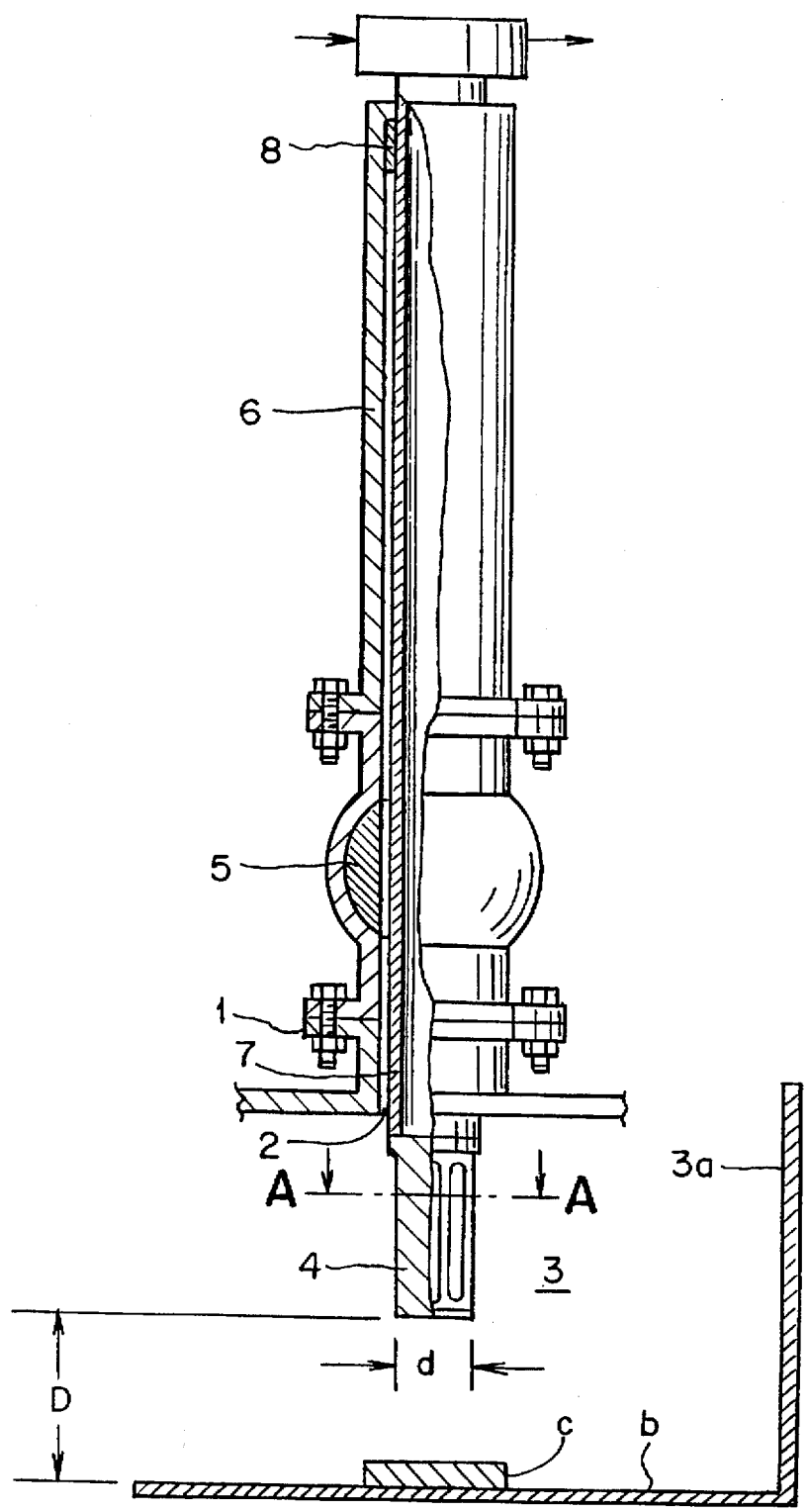
FIG. 1 shows a device for heating carrier bodies and a partial longitudinal section for the deposition reactor.

The drawing figures contain only the features necessary for the understanding of the invention.

DETAILED DESCRIPTION OF PREFERRED EMBODIMENTS

Turning now in detail to the drawings, FIG. 1 shows that the top of a deposition reactor can be recognized in the lower part of FIG. 1. The basic structure of such a reactor is known. Essential parts are a base plate on which there are mounted carrier bodies which are inserted into coolable electrodes, and a coolable bell jar which is inverted over the base plate and at whose top there is a closable opening. In the exemplary diagram, the top is shown as a cylindrical tube 1 which can be gastightly closed, if necessary, by a cover plate. As a result of the invention, the flange opening 2 into the interior 3 of the deposition reactor 3a is comparatively narrow. Through it, the heat radiation system 4 is introduced into the interior 3 of the deposition reactor.

An isolating member 5 is flange connected onto the tube 1. The deposition reactor can be opened and closed using this isolating member 5. The deposition reactor is linked to a protective tube 6 via the isolating member. The protective tube 6 acts as mechanical protection and as guide housing for the heat radiation system 4 and the guide tube 7 holding it. The guide tube 7 and the heat radiation system 4 attached to it are lowered or raised by a drive, not shown in the drawings, depending on whether the heat radiation system 4 is to be brought into the working position at the end of the guide tube in the interior 3 of the deposition reactor or into a rest position above the isolating member 5. If the heat radiation system is disposed in the rest position, the deposition reactor can be gastightly closed with the isolating member 5. Even if the heat radiation system is disposed in the working position and the isolating member is open, sealing and guiding elements 8 between the guide tube 7 and the protective tube 6 ensure an effective isolation from the ambient air. The guide tube is equipped with a connecting lead to the electrical supply of the heat radiation system 4. Furthermore, channels are provided, through which a coolant, for example water, flows in order to cool the heat radiation system and the adjacent parts of the device.

FIG. 1 also shows "d" which is the diameter of the cylindrical heat radiation system 4. "D" is the distance between the heat radiation system 4 and the base "b" of the deposition reactor 3a. Carrier body "c" is placed on base "b".

Figure 2:
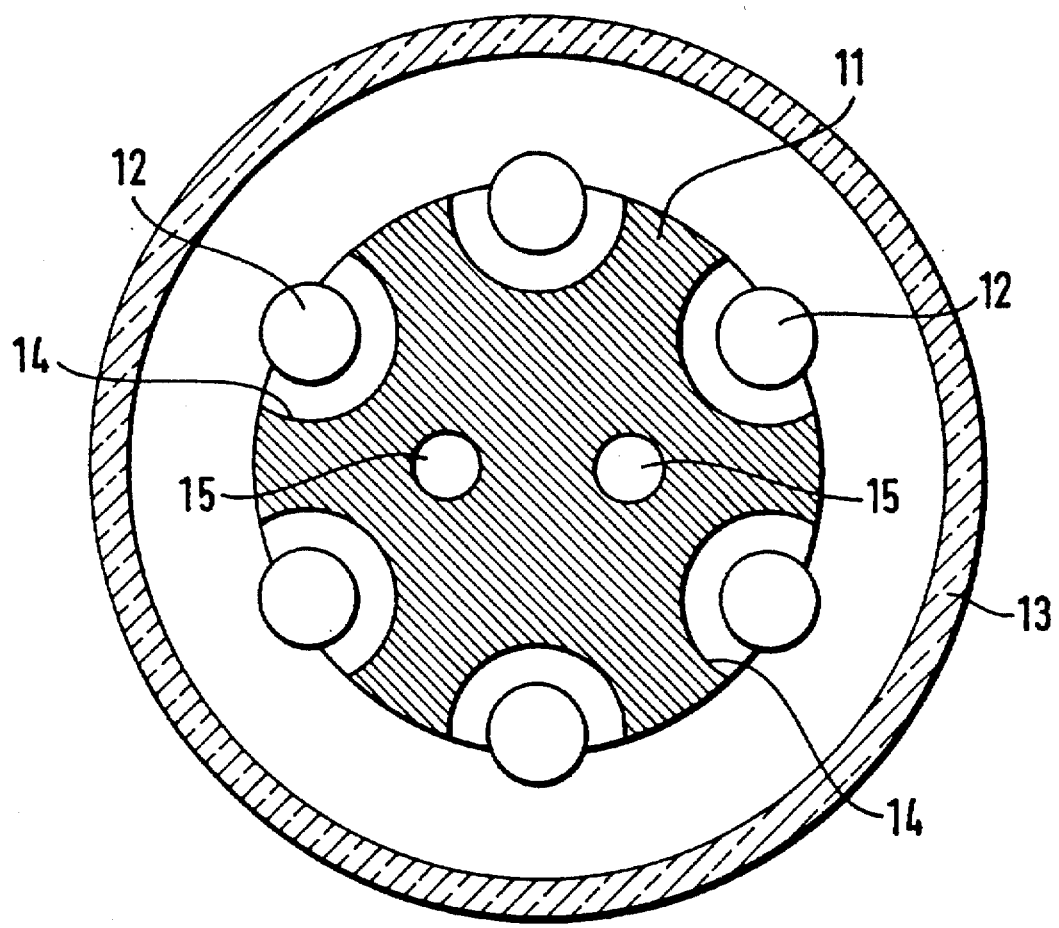
FIG. 2 shows a cross section view along section line A—A of FIG. 1.

From FIG. 2, it can be seen that the heat radiation system essentially comprises a cooling body 11 and heating elements 12. Additionally shown is also a protective quartz sheath 13. As shown in cross-section, the cooling body 11 is of star-shaped structure and the heating elements 12 are disposed at uniform intervals in a ring around the cooling body. They are disposed in recesses 14 whose shape results from the structuring of the cooling body. For the purpose of active cooling, the cooling body has channels 15 through which a coolant such as water flows and which are connected to suitable channels in the guide tube 7.

FIG. 1 shows diagrammatically the heat radiation system 4 in the working position, in the interior 3 of the deposition reactor 3a. The isolating member 5 is open and the guide tube 7 is pushed into the cylindrical tube 1. In accordance with an embodiment of the method, the guide tube 7 is withdrawn after termination of the heating of the carrier bodies c until the heat radiation system 4 has reached a rest position above the isolating member 5. Then the deposition reactor is gastightly closed by means of the sealing member. Prior flushing with inert gas can be omitted.

The present invention has the advantages of substantially contributing to increasing the quality and the productivity during the production of silicon polyrods.

While several embodiments of the present invention have been shown and described, it is to be understood that many changes and modifications may be made thereunto without departing from the spirit and scope of the invention as defined in the appended claims.

What is claimed is:

1. A method for heating silicon carrier bodies in a deposition reactor, said method comprising placing silicon carrier bodies in a deposition reactor;

irradiating the carrier bodies by means of a heat radiation system which emits radiation having a color temperature of at least 2000° C.; and depositing silicon on the carrier bodies.

2. The method as claimed in claim 1, further comprising applying an electrical voltage to the carrier bodies, while irradiating the carrier bodies until a certain current level flows through the carrier bodies.

3. The method as claimed in claim 1, further comprising irradiating the carrier bodies again after silicon has been deposited on the carrier bodies.

4. The method as claimed in claim 1, comprising bringing the heat radiation system into an open deposition reactor through a protective tube before the carrier bodies are heated.

5. The method as claimed in claim 1, comprising opening and closing the deposition reactor by means of an isolating member; and cooling the heat radiation system.

6. A device for heating silicon carrier bodies in a deposition reactor, comprising a heat radiation system having at least one heating element which emits thermal radiation having a color temperature of at least 2000° C., said heating system comprising heating elements which are annularly disposed.

7. The device as claimed in claim 6, wherein the heating element is a halogen/quartz radiant heater.

8. The device as claimed in claim 6, wherein the heating element is a gas discharge lamp.

9. The device as claimed in claim 6, further comprising a cooling body for cooling the heat radiation system.

10. The device as claimed in claim 6, comprising a protective tube for introducing the heat radiation system into an open deposition reactor.

11. The device as claimed in claim 6, comprising an isolating member for opening and closing the deposition reactor.

12. The device as claimed in claim 6, wherein the heat radiation system is cylindrical and has a diameter which is not greater than 200 mm.

13. The device as claimed in claim 6, wherein the deposition reactor has a base; and wherein the distance between the heat radiation system and the base of the deposition reactor is at least 1500 mm.

14. A device for heating silicon carrier bodies in a deposition reactor, comprising a heat radiation system having at least one heating element which emits thermal radiation having a color temperature of at least 2000° C.;

a cooling body for cooling the heat radiation system; and wherein the cooling body is star-shaped and the heating elements are disposed at uniform intervals in a ring around the cooling body.

* * * * *